United States Patent
B et al.

(10) Patent No.: US 11,587,449 B2
(45) Date of Patent: Feb. 21, 2023

(54) SYSTEMS AND METHODS FOR GUIDING A VERTICAL TAKEOFF AND LANDING VEHICLE TO AN EMERGENCY LANDING ZONE

(71) Applicant: HONEYWELL INTERNATIONAL INC., Morris Plains, NJ (US)

(72) Inventors: Jayasenthilnathan B, Bangalore (IN); Gobinathan Baladhandapani, Madurai (IN); Sriram P R, Chennai (IN); Sivakumar Kanagarajan, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 209 days.

(21) Appl. No.: 16/867,134

(22) Filed: May 5, 2020

(65) Prior Publication Data

US 2021/0264798 A1     Aug. 26, 2021

(30) Foreign Application Priority Data

Feb. 21, 2020    (IN) .............................. 202011007442

(51) Int. Cl.
  *G08G 5/00*    (2006.01)
  *G08G 5/02*    (2006.01)
  *B64C 39/02*   (2023.01)
(52) U.S. Cl.
  CPC ......... *G08G 5/0056* (2013.01); *B64C 39/024* (2013.01); *G08G 5/0021* (2013.01);
  (Continued)
(58) Field of Classification Search
  CPC .. G08G 5/0056; G08G 5/0021; G08G 5/0039; G08G 5/0086; G08G 5/0091;
  (Continued)

(56) References Cited

U.S. PATENT DOCUMENTS

| 3,315,920 A | 4/1967 | Caughron |
| 7,487,939 B1 | 2/2009 | Christof |
| (Continued) | | |

FOREIGN PATENT DOCUMENTS

| CN | 104619591 B | 12/2016 |
| CN | 108725750 A | 11/2018 |
| (Continued) | | |

OTHER PUBLICATIONS

Federal Aviation Administration, Helicopter Flying Handbook (FAA-H-8083-21B), Chapters 2 and 7 (Year: 2019).*

*Primary Examiner* — Vivek D Koppikar
*Assistant Examiner* — Dominick Mulder
(74) *Attorney, Agent, or Firm* — Lorenz & Kopf, LLP

(57) ABSTRACT

The present disclosure provides systems and methods for guiding a vertical takeoff and landing, VTOL, vehicle to an emergency landing zone. The systems and methods include determining, via at least one processor, candidate landing zone data by interrogating an emergency landing zone database based at least on VTOL vehicle location, the candidate landing zone data representing a list of candidate emergency landing zones. A target emergency landing zone is selected from the list of candidate emergency landing zones based at least on VTOL vehicle related issues including at least one of unanticipated yaw issues, ground effect issues and modified trend vector issues, thereby providing target emergency landing zone data. Guidance for the VTOL vehicle is determined based on the target emergency landing zone data.

16 Claims, 3 Drawing Sheets

(52) U.S. Cl.
CPC ......... *G08G 5/0039* (2013.01); *G08G 5/0086* (2013.01); *G08G 5/0091* (2013.01); *G08G 5/025* (2013.01); *B64C 2201/146* (2013.01)

(58) Field of Classification Search
CPC ...... G08G 5/025; G08G 5/045; B64C 39/024; B64C 2201/146; B64C 29/00; B64D 45/04
See application file for complete search history.

(56) References Cited

U.S. PATENT DOCUMENTS

| | | | |
|---|---|---|---|
| 9,274,529 | B2 | 3/2016 | Ben-Shachar et al. |
| 9,645,582 | B2 | 5/2017 | Shue |
| 9,683,864 | B2 | 6/2017 | McQuillan et al. |
| 10,134,292 | B2 | 11/2018 | Kushwaha |
| 10,242,580 | B2 | 3/2019 | Groden et al. |
| 2002/0060267 | A1 | 5/2002 | Yavnai |
| 2003/0009268 | A1* | 1/2003 | Inokuchi ................ G01S 17/58 701/14 |
| 2006/0235581 | A1* | 10/2006 | Petillon ................ G08G 5/0078 701/3 |
| 2008/0154447 | A1 | 6/2008 | Spinelli |
| 2011/0264312 | A1* | 10/2011 | Spinelli ................ G08G 5/0056 701/16 |
| 2013/0179011 | A1 | 7/2013 | Colby et al. |
| 2014/0343765 | A1 | 11/2014 | Suiter et al. |
| 2016/0055754 | A1 | 2/2016 | Ling et al. |
| 2016/0093225 | A1 | 3/2016 | Williams et al. |
| 2017/0162061 | A1 | 6/2017 | Srivastav et al. |
| 2017/0210462 | A1* | 7/2017 | PR ........................ G01C 5/005 |

FOREIGN PATENT DOCUMENTS

| | | |
|---|---|---|
| EP | 2224263 A1 | 9/2010 |
| EP | 2555072 A3 | 2/2013 |
| EP | 3588468 A1 | 1/2020 |
| WO | 2014/169353 A1 | 10/2014 |
| WO | 2019008669 A1 | 1/2019 |
| WO | 2019/139845 A1 | 7/2019 |

* cited by examiner

SYSTEMS AND METHODS FOR GUIDING A VERTICAL TAKEOFF AND LANDING VEHICLE TO AN EMERGENCY LANDING ZONE

CROSS REFERENCE TO RELATED APPLICATION

The present application claims benefit of prior filed Indian Provisional Patent Application No. 202011007442, filed Feb. 21, 2020, which is hereby incorporated by reference herein in its entirety.

TECHNICAL FIELD

The present disclosure generally relates to systems and methods for guiding landing of vertical takeoff and landing, VTOL, vehicles during an emergency landing. More particularly, the systems and methods described herein provide for automatically locating an emergency landing zone and providing guidance for the VTOL vehicle to land at the emergency landing zone.

BACKGROUND

There is growing interest in Urban Air Mobility (UAM) concepts powered by Vertical Takeoff and Landing (VTOL) vehicles, particularly electric or electric hybrid VTOLs (eVTOLs). NASA defines UAM as a safe and efficient system for air passenger and cargo transportation within an urban area, inclusive of small package delivery and other urban Unmanned Aerial Systems (UAS) services, that supports a mix of onboard/ground-piloted and increasingly autonomous operations. Technologies that enable safe, quiet, efficient, affordable urban air operations at scale are emerging.

VTOL vehicles commonly are run by rotors and could be subjected to emergency situations in use. Under such situations, providing a nearby area where a landing can be performed through landscape analysis methodology may not be an effective method because it may not take into account VTOL vehicle specific issues.

Thus, there exists a need to have a system which can choose the emergency landing surface while understanding the aircraft centric parameters and situational parameters in accordance with the dynamically changing situation of the urban air mobility vehicle.

Accordingly, an object of the present disclosure is to provide systems and methods for selecting a target emergency landing zone for a VTOL vehicle in a way that considers more deeply the issues affecting the VTOL vehicle, thereby more effectively choosing an emergency landing zone. Furthermore, other desirable features and characteristics of the disclosure will become apparent from the subsequent detailed description and the appended claims, taken in conjunction with the accompanying drawings and this background of the disclosure.

BRIEF SUMMARY

The present disclosure provides systems and methods for guiding a vertical takeoff and landing, VTOL, vehicle to an emergency landing zone. The systems and methods include determining, via at least one processor, candidate landing zone data by interrogating an emergency landing zone database based at least on VTOL vehicle location, the candidate landing zone data representing a list of candidate emergency landing zones. A target emergency landing zone is selected from the list of candidate emergency landing zones based at least on VTOL vehicle related issues including at least one of unanticipated yaw issues, ground effect issues and modified trend vector issues, thereby providing target emergency landing zone data. Guidance for the VTOL vehicle is determined based on the target emergency landing zone data.

This summary is provided to describe selected concepts in a simplified form that are further described in the Detailed Description. This summary is not intended to identify key or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention, which is defined by the claims. Furthermore, there is no intention to be bound by any expressed or implied theory presented in the preceding technical field, background, brief summary, or the following detailed description.

Figure 1:
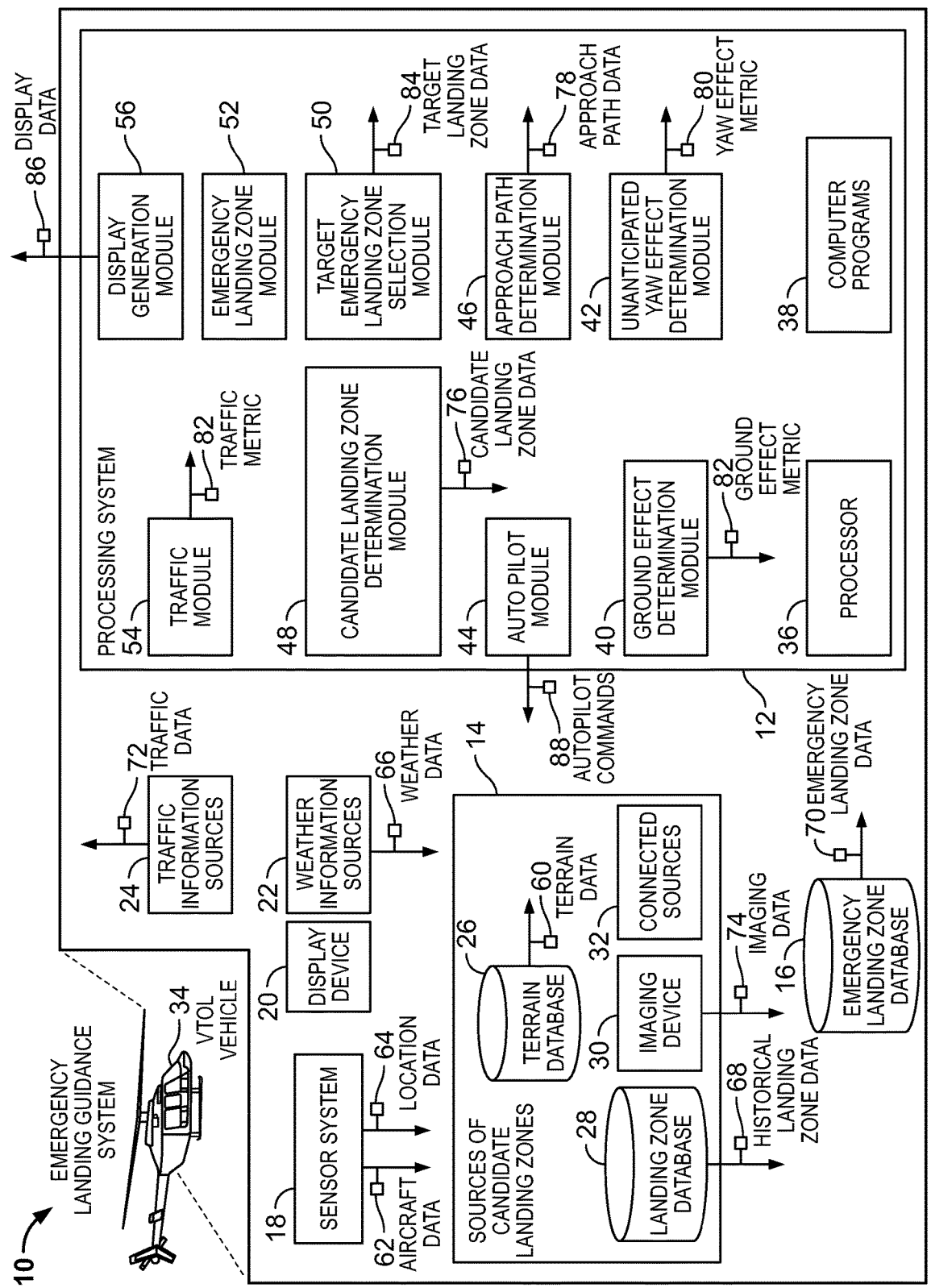
FIG. 1 is a schematic diagram of an emergency landing guidance system, in accordance with the present disclosure.

With reference to FIG. 1, the herein disclosed emergency landing guidance system 10 is configured to analyze terrain (based on terrain data from a terrain database 26) and situational parameters (based on aircraft data 62 from a sensor system 18 and environmental data from weather information sources 22) of the VTOL vehicle 34 like ground effects and rotor speed and compute an optimal target emergency landing zone in the nearest region where the aircraft can land safely.

Continuing to refer to FIG. 1, emergency landing guidance system 10 includes a processing system 12 including a processor 36 and computer programs 38 defining a plurality of modules 40 to 56 for algorithmically selecting a target emergency landing zone. Processing system 12 is configured to obtain a current location of the VTOL vehicle 34 via location data 64 from sensor system. Processing system 12 is configured to determine remaining fuel, landing zone requirements (e.g. dimensions) and other attributes for landing the VTOL vehicle 34 based at least partly on aircraft data 62. In this way, a current location of the VTOL vehicle 34 is taken into consideration along with various attributes of the VTOL vehicle 34 (such as fuel, weight, type of failure, maneuverability, etc.) when choosing a target emergency landing zone. In some embodiments, an emergency landing zone database 16 is maintained by comprehensively recording potential emergency landing zones. Emergency landing zone database 16 is updated with historical data of off-airfield landing zones. Further, terrain data 60 from terrain database 26 can be analyzed to select landing zones based on geographical conditions of an area, which can be used to update emergency landing zone database 16. Using data from emergency landing zone database 16, a list of candidate landing zones near the VTOL vehicle 34 is considered.

Processing system 12 is configured to run logic to filter out landing zones from the list of candidate landing zones to arrive at a reduced list of candidate landing zones. Specifically, processing system 12 is configured to check an approach path for each candidate landing zone which minimizes various VTOL vehicle related effects including unanticipated yaw issues, height-velocity curve issues, issues resulting from modified trend vector based on emergency and oscillating ground effect forces. Processing system 12 is configured to consider wind, temperature and other weather conditions (based on weather data 66 from weather information sources 22) in checking each approach path. From the reduced list of candidate landing zones, one or more target emergency landing zones is selected additionally by determining whether the approach path is clear of buildings and traffic based on traffic data 72 (ground and air traffic) from traffic information sources 24 and building descriptions in terrain data 60.

Figure 3:
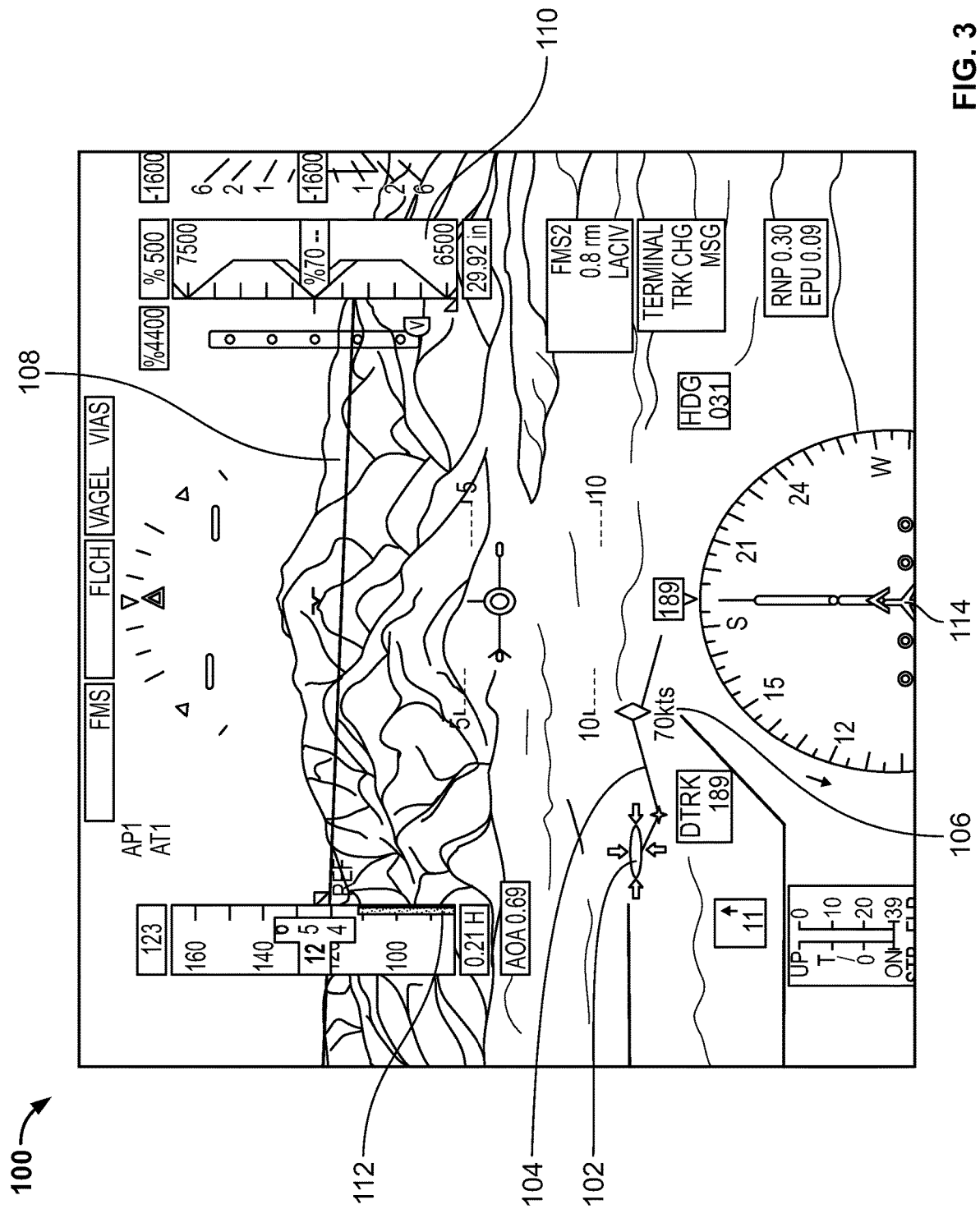
FIG. 3 is an exemplary display generated by emergency landing guidance system of FIG. 1, in accordance with the present disclosure.

With additional reference to FIG. 3, processing system 12 is configured to select the target emergency landing zone as described in the foregoing and generate a display 100 including a graphic 102 representing the location of the target landing surface to a pilot along with a graphic 104 representing the approach path.

Having summarized emergency landing system 10 in the foregoing, a more detailed description is provided in the following with respect to FIGS. 1 to 3. FIG. 1 depicts an exemplary embodiment of emergency landing guidance system 10 including VTOL vehicle 34, sensor system 18, sources of candidate landing zones 14, emergency landing zone database 16, display device 20, traffic information sources 24, weather information sources 22 and processing system 12. It should be understood that FIG. 1 is a simplified representation of emergency landing guidance system 10, and FIG. 1 is not intended to limit the application or scope of the subject matter in any way. In practice, the system 10 and/or VTOL vehicle 34 will include numerous other devices and components for providing additional functions and features, as will be appreciated in the art.

VTOL vehicle 34 is one that can hover, take off, and land vertically. VTOL vehicles can include a variety of types of aircraft including fixed-wing aircraft as well as helicopters and other aircraft with powered rotors, such as cyclogyros/cyclocopters and tiltrotors. VTOL vehicle 34 may be an electric or hybrid-electric vertical takeoff and landing aircraft eVTOL or may be otherwise powered. VTOL vehicle 34 can be a human piloted (ground based or cockpit based) aircraft (usually with assistance of an autopilot module 44) or an unmanned aerial vehicle (drone). VTOL vehicle 34 is, in embodiments, a passenger air vehicle (PAV) or does not carry passengers (e.g. a cargo aircraft). In embodiments, VTOL vehicle 34 is a rotorcraft.

Processing system 12 includes one or more processors 36 that are configured to execute computer programming instructions stored on non-transitory memory (not shown) and embodied in computer programs 38. Functions of the emergency landing guidance system 10 and steps of method 200 (FIG. 2) are executed by one or more processors 36 of processing system 12 executing the associated computer programming instructions. Modules and processing system 12 as described herein refer to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Modules 40 to 56 of processing system are defined in computer programs 38 and executable by processor 36 to carry out the described functions and steps. Modules 40 to 56 are illustrated separately from computer programs 38 purely for the purposes of illustration when they would, in reality, be embodied in computer programs 38.

Processing system 12 includes an emergency landing module 52 configured to maintain emergency landing zone database 16. Emergency landing zone module 52 is configured to receive input data representing landing zones from sources of candidate landing zones 14. In embodiments, emergency landing zone module 52 is configured to receive historical landing zone data 68 from landing zone database 28. Historical landing zone data 68 includes information on off-airfield landing zones that have previously been used by VTOL vehicle 34 and other VTOL vehicles. Emergency landing zone module 52 is configured to receive terrain data from terrain database 26 and to operate a landscape analysis method to determine sufficiently sized, and otherwise suitable, clear areas for performing a landing. Emergency landing zone is configured to receive imaging data 74 from one or more cameras (e.g. imaging device 30) mounted to VTOL vehicles 34 showing live video of underlying terrain. In embodiments, imaging data 74 is obtained from imaging device 30, such as various vision cameras including monocular cameras, stereo cameras, imaging lidar cameras, infrared cameras, etc. A plurality of cameras can be installed on VTOL vehicle 34 including combinations of different types of cameras such as those described above. Emergency landing module 52 is configured to process live images of imaging data 74 to identify nearby clear areas suitable for an emergency landing. In some embodiments, terrain data 60 and imaging data 74 are combined such that suitable areas for an emergency landing zone are identified and double checked. Emergency landing zone module 52 is configured to receive information from connected sources 32, which are off-board or remote sources of emergency landing zone relevant data. For example, areas suitable for emergency landing zones can be identified by other aerial vehicles and shared through network connectivity. Alternatively, imaging data can be shared from other aerial vehicles for onboard analysis by emergency landing zone module 52 to find potential off-airfield landing zones.

Emergency landing zone module 52 is configured to include emergency landing zone data in emergency landing zone database 16 based on one or more of the sources of candidate landing zones 14. The process of updating emergency landing zone database 16 can occur throughout flight of VTOL vehicle 34 or can be performed in response to certain identified events such as flying through an area with a limited number of entries in emergency landing zone database 16 or on identifying one or more fault conditions with VTOL vehicle 34 (based on aircraft data 62 from sensor system 18) that could lead to an emergency landing requirement. Emergency landing zone data 70 includes at least location data (e.g. global coordinates) and dimensions of emergency landing zone. Emergency landing zone data 70 may further include additional information such as slope and surface type and feasible landing approach types (e.g. single angle, double angle, vertical, etc.) and other approach parameters (e.g. gradient).

In one embodiment, sensor system 18 includes a Global Positioning System (GPS) or global navigation satellite system (GNSS) receiver and is configured to determine location of VTOL vehicle 34 based on global position data obtained from satellites, e.g. by trilateration with three or more satellites. In some embodiments, sensor system 18 is configured to determine VTOL vehicle location based on Wide Area Augmentation System (WAAS) or other augmented satellite-based global position data. A network of ground-based reference stations provides measurements of small variations in the GPS satellites' signals so that onboard GPS or GNSS receivers use the corrections while computing their positions to improve accuracy of location data 64. Sensor system 18 includes sensors distributed throughout VTOL vehicle 34 to provide aircraft data 62, as will be described further herein.

Processing system 12 includes a candidate landing zone determination module 48. Candidate landing zone determination module 48 is invoked when one or more fault conditions is/are identified by processing system 12 indicating an emergency landing requirement or based on a user (ground or cockpit based user) input selecting an emergency landing zone requirement. Emergency landing zone module 52 is configured to take into account current location of VTOL vehicle 34 as determined by sensor system 18 and embodied in location data 64. In embodiments, a search radius (or search area) is defined around current location of VTOL vehicle 34 and emergency landing zone database 16 is interrogated to provide emergency landing zone data 70 for all suitable landing zones within that search radius. Suitability of landing zones may be determined based on search radius and additional parameters such as landing zone requirements specific to the VTOL vehicle 34. One landing zone requirement may be a certain minimum dimension. Other requirements may include maximum slope of landing surface, compatible types of landing surface and/or maximum gradient of approach path. Emergency landing zone database 16 may include corresponding fields defining each parameter of the landing zone to allow such interrogation.

In embodiments, the search radius used by candidate landing zone determination module 48 is dynamically determined depending on the nature of the emergency and/or remaining fuel/charge. For example, fault conditions identified in aircraft data 62 may be associated with different urgency levels by processing system 12. A user may input an emergency level directly by selecting an urgency level or selecting an emergency type (passenger cardiac arrest, passenger panic attack, engine failure) and processing system 12 may assign the urgency level using predetermined mappings. The greater the urgency level, the smaller the search radius. Lesser amounts of fuel will correspond to smaller search radii. In embodiments, candidate landing zone determination module 48 is configured to determine a distance based on current or projected fuel/charge consumption rate (from aircraft data 62), amount of remaining fuel/charge and current or projected speed (from aircraft data 62) to determine how far VTOL vehicle 34 can feasibly travel before the remaining fuel/charge is wholly consumed and to use that distance in determining the search radius. In other embodiments, a conservative fixed search radius is selected. In some embodiments, search area is defined by both a maximum radius (as described) and a minimum radius. Minimum radius may take into account current energy and altitude of VTOL vehicle 34 (based on aircraft data 62) to determine an area or radius that is too close to VTOL vehicle location to serve as a feasible emergency landing zone. Candidate landing zone determination module 48 is thus configured to determine a list of suitable candidate emergency landing zones that are sufficiently nearby with respect to a determined search radius (or area). The list of suitable candidate emergency landing zones is embodied in candidate landing zone data 76.

Processing system 12 includes an approach path determination module 46 configured to determine an approach path for each candidate landing zone listed in candidate landing zone data 76. In embodiments, approach path determination module 46 is configured to run a navigation finding algorithm that takes into account current location of VTOL vehicle 34, destination location of candidate landing zone, terrain data 60 representing terrain traversed along a straight path to destination location and constraints of the VTOL vehicle 34 such as maximum and minimum performance capabilities to generate a sequence of three-dimensional way points (latitude, longitude and latitude) forming an approach path. In embodiments, navigation finding algorithm is configured to minimize distance in determining the approach path. In addition to positionally defining approach path, approach path determination module 40 is configured to specify speed of VTOL vehicle 34 along approach path based on current speed and altitude, distance to candidate landing zone and VTOL vehicle 34 specifications. Thus, approach path data 78 includes speed and position data for each candidate landing zone. In embodiments, approach path can include single angle, double angle and vertical (hover) approach paths.

Processing system 12 includes a target emergency landing zone selection module 50, which is configured to receive an array of approach path data 78 defining an approach path for each candidate landing zone in candidate landing zone data 76. Target emergency landing zone selection module 50 is configured to assess each approach path in the approach path data 78 with respect to ground effect issues, unanticipated yaw issues and/or modified trend vector issues and optionally also updraft/downdraft issues and height-velocity (HV) curve issues. Target emergency landing zone selection module 50 is configured to receive metrics indicating a degree of severity of these VTOL vehicle related issues for each approach path from one or more other modules (described further herein). Based on minimizing the severity metrics, the target emergency landing zone selection module 50 is configured to select one, or a subset including more than one, target emergency landing zone(s) from the list of candidate landing zones included in candidate landing zone data 76. Various parameter minimization algorithms are known in the art. Target emergency landing zone selection module 50 is configured to invoke one or more other modules for determining severity metrics for VTOL vehicle related issues such as ground effect determination module 40 and unanticipated yaw effect determination module 42. In some cases, the one or more other modules utilize wind parameters as an input in determining the severity metrics.

Emergency landing system 10 includes weather information sources 22 that provide location specific weather data 66. In embodiments, weather data 66 defines wind direction and strength with respect to location. Unanticipated yaw effect determination module 42 (described below), for example, requires wind parameters from weather data 66 at each candidate landing zone of candidate landing zone data 76. Weather information sources 22 include surface aviation weather observations from ground stations (e.g. METARs), air traffic control weather information, upper air weather observations (e.g. aircraft meteorological data relay (AMDAR) and ground-based, satellite or aircraft mounted radar observations (e.g NEXRAD). Satellite datalink services allow sharing of weather information to provide detailed and comprehensive real-time weather data 66.

Unanticipated yaw is a condition when a yaw moment provided by the VTOL vehicle 34 does not result in actual intended yaw. This can happen, for example, when downwash from a rotor impinges a tail rotor. Unanticipated yaw effect determination module 42 is configured to obtain wind parameters (including direction and strength) from weather data 66 for each candidate landing zone in candidate landing zone data 76. Unanticipated yaw effect determination module 42 is configured to compute relative angle of direction of travel of the VTOL vehicle 34 (which is known from approach path data 78) with respect to wind direction (which is known from weather data 66). The effect of unanticipated yaw can be determined based on relative angle of wind direction and projected direction of travel of VTOL vehicle 34 (which is known from approach path data 78), wind strength and speed of VTOL vehicle (which is predicted in approach path data 78). In embodiments, unanticipated yaw effect determination module 42 is configured to determine angle of incidence of wind with respect to a main rotor of VTOL vehicle 34 (as projected in approach path data 78). Unanticipated yaw is more prevalent at lower speeds of the VTOL vehicle 34 and at higher wind strengths. During landing, the speeds of the VTOL vehicle go to low values, thus unanticipated yaw effect determination module 42 estimates yaw effect metric 80 relating to a projected severity of yaw effect.

Loss of Tail rotor Effectiveness (LTE) is a condition similar to unanticipated yaw. Unanticipated yaw is seen as a condition where yawing is inefficient, or it is unexpected. LTE is seen as a condition where the tail rotor becomes ineffective or stalled. From an algorithmic standpoint, unanticipated yaw effect module 46 will also detect and assess LTE conditions as an input for target emergency landing zone selection module 50.

Ground effect determination module 40 is configured to determine ground effect altitudes for each approach path in approach path data 78. Ground effect altitudes (in ground effect and out of ground effect) provide a maximum altitude at which the helicopter can hover when in ground effect and when out of ground effect based on aircraft and environmental parameters. Aircraft parameters include available power for the VTOL vehicle 34 and gross weight (which is based on weight at take-off reduced based on fuel consumed (which is known from aircraft data 62)). Available power may be based on a specification for the VTOL vehicle 34 or based on a degraded performance that is currently available due to emergency, which is determined from sensor system 18 and embodied in aircraft data 62. Environmental parameters include altitude (which is representative of density altitude) and temperate (which is known from weather data 66) at the projected hovering location (which is known from approach path data 78). Ground effect metric 82 can be determined based on how close hovering (defined in the approach path) is to a maximum performance ceiling defined by ground effect altitudes. The closer to the ground effect altitude maximums, the greater risk of performance and thus higher ground effect metric 82. Ground effect altitudes can be calculated by ground effect determination module 82 based on digital performance charts for VTOL vehicle 34 or a mathematical function embodying the performance charts. In some embodiments, wind strength and wind direction may be factored in to ground effect metric 82 by ground effect determination module 40 as these weather parameters (from weather data 66) can be problematic when hovering.

Processing system 12 may include other modules for determining metrics relating to VTOL vehicle issues. In accordance with various embodiments, processing system 12 includes a module (not shown) for determining modified trend vector issues. Processing system 12 is configured to determine a trend vector based on aircraft data 62 and to determine a modified trend vector based on environmental conditions like wind and fault conditions causing changed performance of the VTOL vehicle 34 (e.g. a reduced power affecting speed or maneuvering). In other embodiments, a module for determining an updraft/downdraft metric is provided. Processing system 12 is configured to analyze terrain data 60 to determine conditions that are likely to result in updrafts or downdrafts by analyzing changes in elevation above predetermined thresholds and associated wind from weather data. When the elevation change (whether increasing or decreasing) exceeds the threshold and wind is directed to a face of the elevated body, an updraft or downdraft is likely created. Strength of wind and degree of elevation change will impact on strength and profile of updraft or downdraft. Updraft or downdraft information may also be directly available from weather data 66 as a result of, for example, reporting from other aerial vehicles. Processing system 12 is configured to determine impinging updrafts and/or downdrafts for each approach path and determine likely impact (based on strength of draft) on VTOL vehicle 34 in order to arrive at an updraft/downdraft metric. Updraft/downdraft metric is useful by target emergency landing zone selection module 50 to select a target emergency landing zone from the list of candidate landing zones.

In some embodiments, processing system includes traffic module 54, which is configured to receive traffic data 72 from traffic information sources 24 and to determine a traffic metric 82 representative of amount (severity) of traffic along each approach path and in proximity to each candidate landing zone. Traffic information sources 24 include information on air and ground traffic. Air traffic data 72 is obtainable from air traffic control information and optionally connected data exchange between VTOL vehicle 34 and aerial and ground vehicles. When a candidate landing zone is within sight, a vision system of sensor system 18 can be used to determine how much traffic there is at the candidate landing zone and along the approach path. Ground traffic sources can also be used such as those available from ground vehicle navigation servers (e.g. Google maps server). Accordingly, various sources of traffic information are accessed to provide traffic data 72. Traffic module 54 is configured to determine traffic metric 82 based on amount of traffic in and around (e.g. a predetermined area around approach path and candidate landing zone) approach path for each candidate landing zone in candidate landing zone data 76. A lowest possible traffic metric would be provided for clear approach paths and higher numbers would be provided depending on traffic density.

In embodiments, target emergency landing zone selection module 50 is configured to also take into account traffic metric (or generally traffic data 72) in selecting a target emergency landing zone from a list of candidate landing zones so as to reduce risk of traffic interference. In some embodiments, target emergency landing zone selection module 50 takes into account further factors like preferring landing zones with less surrounding building density (which can be determined from analyzing terrain data 60). Target emergency landing zone selection module 50 is configured to embody one or more selected target emergency landing zones in target emergency landing zone data 84 defining at least global coordinates for the target emergency landing zone and optionally dimensions thereof.

Referring to FIGS. 1 and 3, processing system 12 includes a display generation module 56 configured to generate a display 100 (FIG. 3) graphically highlighting a location of the target emergency landing zone based on target emergency landing zone data. Display generation module 56 is configured to transform real world coordinates of target emergency landing zone in target emergency landing zone data 84 into image space in order to accurately locate target emergency landing zone graphic 102. Further, display generation module 56 is configured to plot the approach path from approach path data 78 in image space in the form of approach path graphic 104. Display 100 may further include speed data 106 at one or more points (e.g. defined way points) along the approach path graphic 104 representing target speed for the VTOL vehicle 34. In embodiments, display generation module 56 is configured to receive images from camera in sensor system 18 and terrain data 60 from terrain database 26, flight information from sensor system 18 and other onboard systems, and location data 64 to provide an at least partly synthesized 3-D rendering of the forward terrain. For example, natural terrain and buildings may be synthesized and displayed along with live video from the camera in sensor system 18, in addition to the graphical elements 102, 104, 106 and graphical display of aircraft parameters from aircraft data 62 (like aircraft speed in speed tape 112, aircraft altitude in altitude tape 110 and aircraft location 114). Although display 100 of FIG. 3 is a 3D perspective, synthetic vision display, other display formats are suitable for graphically displaying location of VTOL vehicle 34, approach path to a target emergency landing zone and a location of target emergency landing zone. Display generation module 56 is configured to generate display data 86 representing a display 100 to be rendered by display device 20.

Display device 20 is configured to output display 100 based on display data 86. In embodiments, the display device 20 is located remotely from VTOL vehicle 34 or in a cockpit of the VTOL vehicle 34 or a combination of both. Display device 20 is a primary flight display, a heads up display, a head mounted display or some other type of display in various embodiments.

In some embodiments, autopilot module 44 is configured to receive target emergency landing zone data 84 and associated approach path from approach path data 78 to automatically fly VTOL vehicle 34 along the approach path to the target emergency landing zone. Hardware (e.g. actuators of various kinds) is connected to receive autopilot commands 88 from autopilot module 44 in order to fly VTOL vehicle 34 to the target emergency landing zone. Autopilot systems that automatically control VTOL vehicle hardware in order to track a defined path are known in the art. In some embodiments, both display generation module 56 and autopilot module 44 are provided. In other embodiments such as unmanned VTOL vehicle embodiments, autopilot module 44 is provided without display generation module 56.

Whilst emergency landing guidance system 10 is described herein as being located in VTOL vehicle 34, it should be understood that remote or cloud processing capabilities and data sources could be used by VTOL vehicle 34. As such, one or more components described with respect to VTOL vehicle 34, particularly processing system 12 and the associated modules 40 to 56, may not necessarily be located onboard the VTOL vehicle 34.

Figure 2:
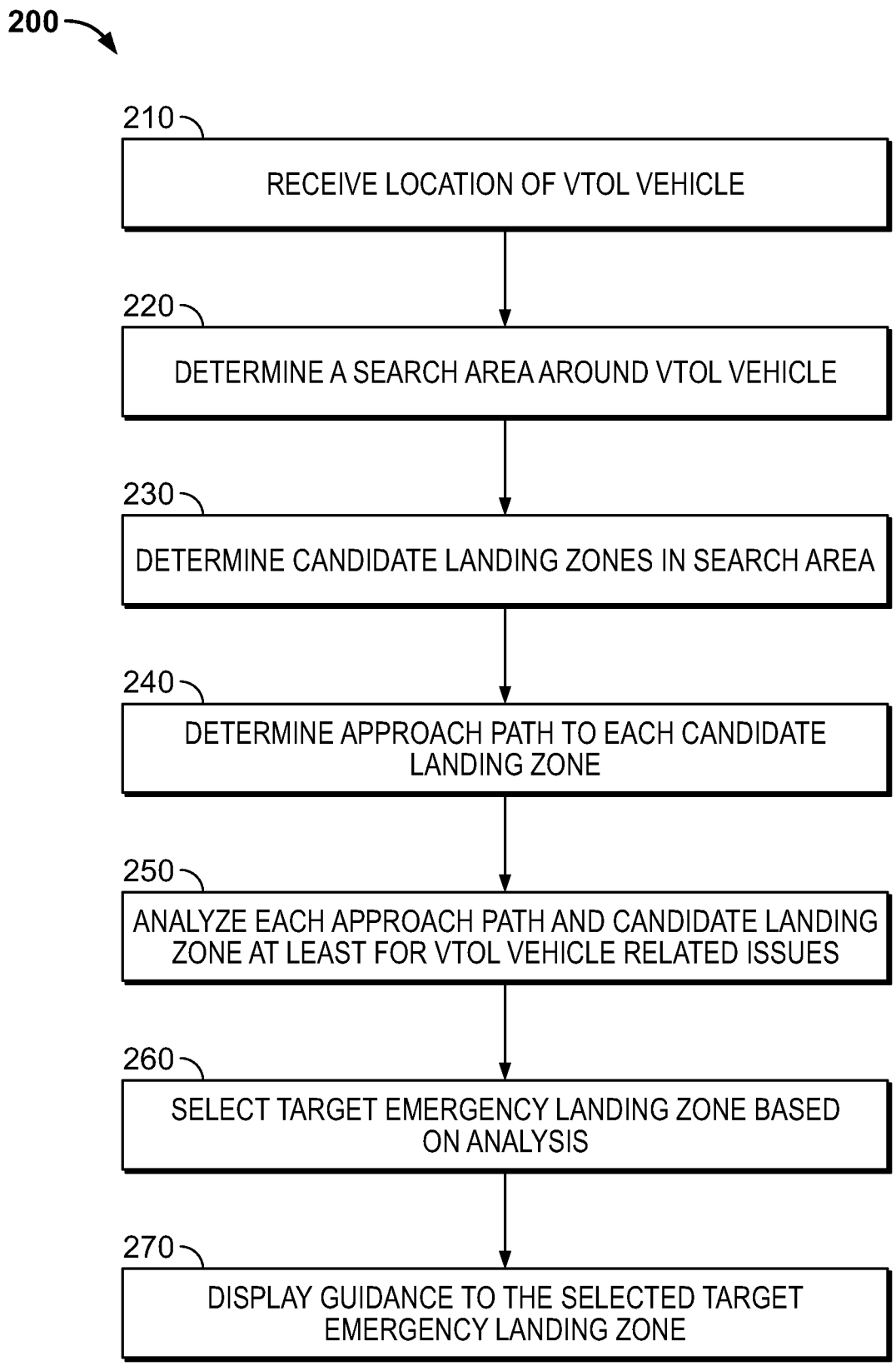
FIG. 2 is a flowchart of operation of the emergency landing guidance system of FIG. 1, in accordance with the present disclosure.

FIG. 2 is a flowchart illustrating an exemplary method 200 for providing guidance to an emergency landing zone, in accordance with various embodiments. Steps of method 200 are performed by the processing system 12 (FIG. 2) executing computer programming instructions of computer programs 38. Method 200 commences, in some embodiments, when an emergency landing requirement is automatically detected based on one or more fault conditions indicated by aircraft data 62 or when a selection is made by a pilot though a user interface (not shown) of VTOL vehicle 34.

Method 200 includes step 210 of receiving, at processing system 12, location of VTOL vehicle 34 based on location data 64 from sensor system 18. Location data 64 is generally determined from global positioning satellite receivers in sensor system 18. Method 200 includes step 220 of determining a search area around VTOL vehicle 34 based on the location data 64. In embodiments, the search area is dynamically determined, by processing system 12, to take into account at least one of the following parameters: remaining fuel/charge, current energy of VTOL vehicle 34 (based on speed and altitude in aircraft data 62) and emergency type (e.g. degree of urgency).

Method 200 includes step 230 of determining, by candidate landing zone determination module 48, candidate landing zones in the search area determined in step 220. In embodiments, emergency landing zone database 16 is interrogated to provide emergency landing zone data 70 for each suitable recorded emergency landing zone in the search area. Suitability of candidate landing zones is determined based on at last one of the following parameters: type of landing surface required, size of landing surface required, maximum slope of landing surface required, possible approach types, maximum approach gradients, all according to specifications of VTOL vehicle 34. Step 230 produces candidate landing zone data 76, which defines global coordinates of the landing zone and optionally further information such as at least one of: dimensions of landing zone, required approach type, slope of landing zone, type of surface of landing zone. In step 240, an approach path is determined, by approach path determination module 46, to each candidate landing zone based on candidate landing zone data 76. In embodiments, step 240 includes running a minimum distance navigation finding algorithm to provide an approach path defined by waypoints for the VTOL vehicle 34 to follow in the form of approach path data 78.

Method 200 includes step 250 of analyzing each approach path and candidate landing zone based on approach path data 78 at least for VTOL vehicle related issues. In embodiments, step 250 includes analyzing each approach path and candidate landing zone with respect to wind direction and strength at the landing zone and a VTOL vehicle related issue. Wind direction and strength are determined based at least on weather data 66. In embodiments, VTOL vehicle related issues include ground effect issues, unanticipated yaw issues and modified trend vector issues. Other VTOL vehicle related issues include HV curve issues and updraft and downdraft issues. In embodiments, step 250 encompasses determining an unanticipated yaw effect metric 80, by unanticipated yaw effect determination module 42, representative of projected severity of unanticipated yaw effects (which are also representative of LTE issues) based on wind direction and strength at the candidate landing zone relative to VTOL vehicle direction of travel according to the approach path. In embodiments, step 250 encompasses determining a ground effect metric 82 representative of projected ground effect issues based on determined ground effect altitudes. Yet further, a modified trend vector metric is determined. Other metrics representative of VTOL vehicle related issues can be determined in step 250. For example, a metric representative of compliance of the approach path with Height-Velocity (HV) curve of VTOL vehicle 34 (which is known as part of digital specification for VTOL vehicle 34). HV curve can be determined based on density altitude (determined from temperature (known from weather data 66) and altitude along approach path) and weight of VTOL vehicle 34 (as derived from initial weight and any loss of fuel). In another example, updraft and/or downdraft metrics are determined for each approach path and candidate landing zone based on terrain information and wind information as described herein. In embodiments, step 250 includes target emergency landing zone selection module minimizing the metrics representing VTOL vehicle related issues and possible further factors like traffic data 72 around each approach path and candidate landing zone in order to select one (or a subset) of the candidate landing zones as the target emergency landing zone(s). Step 250 includes outputting target emergency landing zone data 84 representing at least one selected target emergency landing zone.

Method includes step 270 of displaying guidance to the selected target emergency landing zone. Step 270 includes, in some embodiments, displaying a synthetic vision display including synthetic terrain features 108 (based on terrain data 60) and aircraft parameter features 110, 112 (based on aircraft data 62) as well as graphics indicating location of target emergency landing zone 102, an approach path 104 to target emergency landing zone, target speeds 106 along the approach path and a location 114 of the VTOL vehicle 34. In additional or alternative embodiments, the target emergency landing zone and approach path information included in target emergency landing zone data 84 from step 260 is fed to autopilot module 44 in order to automatically track VTOL vehicle 34 along the defined approach path to land at the target emergency landing zone.

Embodiments of the emergency landing guidance system 10 have been described in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The use cases and the depictions provided here are only exemplary in nature. It should be possible to use different symbology and semantics to accomplish the same concepts described herein.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. Various changes may be made in the function and arrangement of elements described in an exemplary embodiment without departing from the scope of the invention as set forth in the appended claims.

The invention claimed is:

1. A method for providing guidance to an emergency landing zone in a vertical takeoff and landing, VTOL, vehicle, the method comprising:

determining, via at least one processor, candidate landing zone data by interrogating an emergency landing zone database based at least on VTOL vehicle location, the candidate landing zone data representing a list of candidate emergency landing zones;

determining an approach path for each of the candidate emergency landing zones including determining a speed of the VTOL vehicle along the approach path, thereby providing approach path data for each of the candidate emergency landing zones including predicted speed and position of the VTOL vehicle;

selecting, via the at least one processor, a target emergency landing zone from the list of candidate emergency landing zones based at least on VTOL vehicle related issues, thereby providing target emergency landing zone data, wherein the selecting of the target emergency landing zone from the list of candidate emergency landing zones includes assessing each approach path with respect to minimizing the VTOL vehicle related issues, and wherein the VTOL vehicle related issues include ground effect altitudes and the method includes using parameters of the VTOL vehicle and environmental parameters including altitude, weight, available power and temperature in determining ground effect altitudes for each approach path from a database relating weight, altitude, temperature and power to ground effect altitudes and wherein VTOL vehicle related issues include predicted yaw effects and the method includes predicting yaw effects for each approach path based on relative angle of wind direction with respect to a main rotor of the VTOL vehicle, which is projected from the approach path data, wind strength and speed of the VTOL vehicle, which is predicted in the approach path data, wherein the yaw effects occur when a yaw moment provided by the VTOL vehicle does not result in actual yaw by the VTOL vehicle as a result of downwash from the main rotor impinging on a tail rotor; and determining guidance for the VTOL vehicle based on the target emergency landing zone data.

2. The method of claim 1, wherein determining guidance for the VTOL vehicle includes generating a display graphically identifying the target emergency landing zone and a location thereof.

3. The method of claim 2, wherein determining guidance for the VTOL vehicle includes generating a display graphically identifying the target emergency landing zone, a location thereof and a descent path thereto.

4. The method of claim 1, wherein determining guidance for the VTOL vehicle includes generating control commands to land the VTOL vehicle at the target emergency landing zone.

5. The method of claim 1, wherein selecting the target emergency landing zone from the list of candidate emergency landing zones is further based on traffic data.

6. The method of claim 1, wherein determining the candidate emergency landing zone data is further based on at least one of data representing historical unofficial landing areas that have been used for a successful landing area and terrain survey data.

7. The method of claim 1, wherein selecting a target emergency landing zone from the list of candidate emergency landing zones is based at least on assessing VTOL vehicle related issues with respect to weather data.

8. The method of claim 1, wherein determining the candidate landing zone data is further based on landing requirements of the VTOL vehicle and/or remaining fuel or charge of the VTOL vehicle.

9. The method of claim 1, wherein determining the candidate landing zone data is further based on remaining fuel or charge of the VTOL vehicle.

10. A system for providing guidance to an emergency landing zone in a vertical takeoff and landing, VTOL, vehicle, the system comprising:

a display device;

a sensor system configured to provide location data for a location of the VTOL vehicle;

at least one processor in operable communication with the sensor system and the display device and configured to execute program instructions, wherein the program instructions are configured to cause the at least one processor to:

determine candidate landing zone data by interrogating an emergency landing zone database based at least on the location data for the VTOL vehicle, the candidate landing zone data representing a list of candidate emergency landing zones;

determine an approach path for each of the candidate emergency landing zones, wherein determining an approach path for each of the candidate emergency landing zones includes determining a speed of the VTOL vehicle along the approach path, thereby providing approach path data for each of the candidate emergency landing zones including predicted speed and position of the VTOL vehicle;

predicting yaw effects for each approach path based on relative angle of wind direction with respect to a main rotor of the VTOL vehicle, which is projected from the approach path data, wind strength and speed of the VTOL vehicle, which is predicted in the approach path data;

use parameters of the VTOL vehicle including altitude, weight and available power and environmental parameters including temperature in determining ground effect altitudes for each approach path from a database relating weight, altitude, temperature and power to ground effect altitudes;

select a target emergency landing zone from the list of candidate emergency landing zones based at least on minimizing VTOL vehicle related issues including the predicted yaw effects and the ground effect altitudes, thereby providing target emergency landing zone data; and determine guidance for the VTOL vehicle based on the target emergency landing zone data including generating a display to be displayed by the display device that graphically identifies the target emergency landing zone and a location thereof.

11. The system of claim 10, wherein the program instructions are configured to cause the at least one processor to determine guidance for the VTOL vehicle including generating the display to graphically identify the target emergency landing zone, the location thereof and a descent path thereto.

12. The system of claim 10, wherein the program instructions are configured to cause the at least one processor to determine guidance for the VTOL vehicle including generating control commands to land the VTOL vehicle at the target emergency landing zone.

13. The system of claim 10, wherein selecting the target emergency landing zone from the list of candidate emergency landing zones is further based on traffic data.

14. The system of claim 10, wherein determining the candidate emergency landing zone data is further based on at least one of data representing historical unofficial landing areas that have been used for a successful landing area and terrain survey data.

15. The system of claim 10, wherein determining the candidate landing zone data is further based on landing zone requirements of the VTOL vehicle and/or remaining fuel or charge of the VTOL vehicle.

16. The system of claim 10, wherein the program instructions are configured to cause the at least one processor to generate a display on the display device including the approach path for the selected target emergency landing zone.

* * * * *